(12) United States Patent
Klanner et al.

(10) Patent No.: US 10,225,171 B2
(45) Date of Patent: Mar. 5, 2019

(54) ASSIGNING TIME STAMPS TO RECEIVED DATA PACKETS

(71) Applicant: Bayerische Motoren Werke Aktiengesellschaft, Munich (DE)

(72) Inventors: Felix Klanner, Singapore (SG); Armin Bartsch, Munich (DE); Horst Kloeden, Munich (DE); Andreas Rauch, Kammerberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 365 days.

(21) Appl. No.: 14/736,560

(22) Filed: Jun. 11, 2015

(65) Prior Publication Data

US 2015/0312130 A1 Oct. 29, 2015

Related U.S. Application Data

(63) Continuation of application No. PCT/EP2013/075555, filed on Dec. 4, 2013.

(30) Foreign Application Priority Data

Dec. 12, 2012 (DE) ........................ 10 2012 222 881

(51) Int. Cl.
  *H04L 12/26* (2006.01)
  *H04J 3/06* (2006.01)
  *H04L 29/08* (2006.01)

(52) U.S. Cl.
  CPC .......... *H04L 43/106* (2013.01); *H04J 3/0658* (2013.01); *H04L 67/12* (2013.01)

(58) Field of Classification Search
  CPC ....... H04L 43/106; H04L 67/12; H04J 3/0658
  See application file for complete search history.

(56) References Cited

U.S. PATENT DOCUMENTS 6,839,659 B2 1/2005 Tarassenko et al.
2006/0209752 A1* 9/2006 Wijngaarden ........... H04W 4/04
                                                                     370/328

(Continued)

FOREIGN PATENT DOCUMENTS

DE    201 21 466 U1    2/2003
EP    0 394 051 A2    10/1990

OTHER PUBLICATIONS

International Search Report (PCT/ISA/210) dated Feb. 17, 2014, with English translation (Seven (7) pages).

(Continued)

*Primary Examiner* — Rhonda L Murphy
(74) *Attorney, Agent, or Firm* — Crowell & Moring LLP

(57) ABSTRACT

A method is provided for assigning a time stamp to a specific data packet which, as with a group of received data packets, is received by a cyclically operating sensor. The specific data packet is especially part of the group of received data packets. The disclosed method includes: determining the time of arrival of each data packet of the group of received data packets; assigning a time stamp to each data packet of the group of data packets; determining the time difference between the determined time of arrival and the assigned time stamp for each data packet of the group of data packets; determining the smallest time difference from among the determined time differences; and assigning a time stamp to the specific data packet on the basis of the time of arrival determined for the data packet for which the smallest time difference has been determined.

12 Claims, 5 Drawing Sheets

(56) References Cited

U.S. PATENT DOCUMENTS

2009/0225787 A1 9/2009 Andre
2012/0155497 A1* 6/2012 Lee ..................... H04J 3/0697
　　　　　　　　　　　　　　　　　　　　　　　370/507

OTHER PUBLICATIONS

German Search Report dated Feb. 28, 2013, with English translation (Ten (10) pages).
Ganeriwal et al., "Estimating Clock Uncertainty for Efficient Duty-Cycling in Sensor Networks", Networked and Embedded Systems lab, 56-125B, EE-IV, vol. 17, No. 3, Jun. 1, 2009, pp. 843-856, XP011248103 (Twelve (12) pages).
Huck et al. "Precise Timestamping and Temporal Synchronization in Multi-Sensor Fusion", 2011 IEEE Intelligent Vehicles Symposium (IV), Baden-Baden, Germany, Jun. 5-9, 2011, pp. 242-247, XP031998982 (Six (6) pages).

\* cited by examiner

ASSIGNING TIME STAMPS TO RECEIVED DATA PACKETS

CROSS REFERENCE TO RELATED APPLICATIONS

This application is a continuation of PCT International Application No. PCT/EP2013/075555, filed Dec. 4, 2013, which claims priority under 35 U.S.C. § 119 from German Patent Application No. 10 2012 222 881.0, filed Dec. 21, 2012, the entire disclosures of which are herein expressly incorporated by reference.

This application contains subject matter related to U.S. application Ser. No. 14/735,528, entitled "Assigning Time Stamps to Received Data Packets" filed on even date herewith.

BACKGROUND AND SUMMARY OF THE INVENTION

The invention relates to a method for assigning a time stamp to a specific received data packet, a corresponding device and a corresponding computer program.

Modern vehicles are often equipped with driver assistance systems which provide many functions such as emergency braking or the identification of lane markers. Likewise, there are considerations to allow environmental models to be calculated by central processing units in vehicles, which models can, in turn, be used as output data for driver assistance systems. For these purposes, sensors are provided in vehicles, which sensors measure the properties of the environment of the vehicle or the properties of the vehicle itself. The measured data of the sensors is usually transferred from the sensors to the processing unit or units via a bus, such as a CAN bus.

Since, as a rule, the environment of a vehicle changes during use because the vehicle or other road users move(s), the instant at which the measured data was detected by the sensor is important in the processing of the measured data. The sensor measurement then relates in particular to the environment as it was at a determined instant. The sensor measurement has only limited significance, if any, for another instant.

For this reason, it is generally desirable to also specify the time at which a measurement was performed with said measurement of a sensor. Information of this type is referred to as a time stamp. In this case, it is essential that the instant of the measurement can be reliably determined by the processing unit in its own time logs since the measured data is processed on this basis and since this can often only be set with reference to the real environment of the vehicle. This requirement is particularly relevant in the case of linking or fusion of data of a plurality of sensors. Without temporal classification of the data of a plurality of sensors with respect to one another, the data cannot be processed together in a meaningful way.

However, sensors are often not set up also to output, in addition to the output measured data, a time stamp or information having this purpose by which the processing unit could reliably determine the instant of the measurement. Even if a sensor has a time log which is generally suitable for generating a time stamp, this is often not synchronized with the time log of the processing unit which is essential for processing and is often susceptible to errors such as drift. As a result, therefore, no usable time stamp can be provided by most sensors for the measured data thereof.

Nevertheless, an obvious solution to providing time stamps for the sensor data entering the processing unit is to assign the respective sensor data items the arrival time thereof at the processing unit as time stamp. However, this method does not only present the disadvantage that the assigned time stamp indicates an instant which is generally delayed with respect to the instant of the actual measurement, but also that the delay is not constant in practice. This is based on the fact that the transit time of a data packet from the sensor to the processing unit is subject to various random influences, such as utilization of the transfer buses which are also used by other independent users, scheduling of the processing unit or of intermediately connected buffers or other comparable influences. The transfer time is therefore subject to fluctuations, also referred to as jitter. Depending on the purpose of the sensor data, the frequency of the measurements of the sensor or to what extent the use is time-critical, this jitter may lead to the received sensor data being usable only to a limited extent or even not at all on the basis of a time stamp determined in this way.

Proceeding from the above-described solution, methods are proposed in the prior art with which time stamps can be determined in an improved manner for sensors which perform measurements and output sensor data in an at least approximately cyclic fashion. Owing to the frequent use of such sensors, said methods are widely applicable.

In the publication "Precise Timestamping and Temporal Synchronization in Multi-Sensor Fusion", Tobias Huck et al., Intelligent Vehicles Symposium (IV), 2011, IEEE, pages 242 to 247, such a method is presented in detail. According to that method, the cyclicity of the sensor measurements is used in order to infer or estimate the cycle time of the sensor by observing several cycles (using the arrival times of received data packets). In fact, a Kalman filter is used for this purpose. The time stamp which is then assigned to a data packet is determined as follows: proceeding from the arrival time of the data packet which has the shortest transit time determined by the processing unit (the so-called reference), a time stamp is assigned to a data packet following said data packet on the basis of a multiple of the estimated cycle time. In this way, the best available approximation of the actual measurement instant of the sensor (in particular the arrival time of the packet with the shortest transit time) benefits all subsequent data packets. The assigned time stamps are also free of fluctuations of the size of a jitter.

Further explanations relating hereto are given in the section "Algorithm II" of said document. FIG. 1 also reproduces the principle schematically. The sensor performs measurements which ideally follow the cycle illustrated by $T_1$, $T_2$, etc. and transmits data packets on the basis of the measurements to the processing unit. The data packets undergo a delay (illustrated by the arrows pointing downward) and reach the processing unit at an arrival time. The data packet with the shortest transit time in this case is the data packet which was sent at $T_1$. The arrival time of the data packet forms the reference (in other words: the reference is set). For this data packet, the arrival time is the same as the time stamp, in this case $V_1$. The time stamps $V_1$, $V_2$, $V_3$, etc. are assigned on the basis of the reference. In this case, the estimated cycle time (illustrated by the horizontal arrows) is added to each subsequent data packet after $V_1$. In this example, it should be assumed that the cycle time is estimated accurately. As can be readily seen, the assigned time stamps $V_2$, $V_3$, etc. are always earlier than the actual arrival time of the data packets and hence better estimations for the actual measurement instant of the sensor.

However, the method disclosed in the above-mentioned publication fails to take into account two aspects which can lead to imprecisely assigned time stamps. The first aspect relates to the case in which the sensor, potentially owing to temporary external influences, performs a single measurement (or a group of measurements) earlier in comparison with its cycle. A problem then exists when the sensor performs a measurement at such an early instant that the arrival time of the data packet resulting from the measurement is before the instant at which measurements take place in its normal cycle and if the sensor then returns to the original cycle. In such a case, the assigned time stamps for all subsequent measurements are before the actual measurement instant and are therefore erroneous.

FIG. 2 schematically illustrates this phenomenon, building upon the diagram of FIG. 1 under the assumption of an accurate estimation of the cycle time. The measurement of the sensor which was actually to be performed at the instant $V_3$ is performed prematurely. The data packet based thereon reaches the processing unit before the instant $V_3$ and at the same time as the data packet with the shortest transit time according to the algorithm of the publication mentioned above. The arrival time of this data packet ($V_3$) is consequently set as the new reference of the method (in other words: the reference is reset). The assigned time stamps for this data packet and for future data packets are calculated on the basis of the reference. As can be seen, the assigned time stamps $V_3$, $V_4$, $V_5$, etc. are too early in comparison with the actual measurement instants and even their absolute error in comparison with the actual measurement instants is greater than before for $V_1$ and $V_2$. According to the algorithm of the above-mentioned publication, this excessively early placement of the reference is not corrected.

The second aspect relates to the case of assigning time stamps to data packets shortly after starting the system when the cycle time of the sensor has not yet been reliably, that is to say (substantially) accurately, determined. If a period which is too short is assumed for the cycle time of a sensor, for example, which period only settles to the right value after a greater number of received data packets, in this case it is likewise possible for the reference to be placed too early. FIG. 3 schematically illustrates this case, building on the scheme from FIG. 1. For the purpose of clarity, it should be assumed here that the cycle time of the sensor at the start is estimated to be too short by just 9% and this estimation is not corrected for three cycles. After the three estimations which are too short, it should be assumed for the purpose of the explanation that the cycle time is directly correctly estimated. The cycle time which was estimated to be too short is illustrated by dashed horizontal arrows in FIG. 3. From the fourth cycle time, the cycle time is correctly estimated again (illustrated further by solid horizontal arrows). As is evident, the reference with the data packets which are based on measurements at instants $T_2$ and $T_3$ is shifted further forward until it is earlier than the respective actual measurement instant. According to the algorithm of the publication mentioned above, said excessively early placement of the reference is not corrected. The absolute error of the assigned time stamps in comparison with the actual measurement instant is greater than ($V_1$) which was originally determined for the first data packet.

The problem addressed by the invention is to identify and correct excessively early placement of the reference.

The problem is solved by a method, a device, a vehicle and a computer program in accordance with embodiments of the invention.

In one aspect, a method for assigning a time stamp to a specific data packet which, as with a group of received data packets, is received by a cyclically operating sensor, wherein the specific data packet is in particular part of the group of received data packets, comprises: determining the time of arrival for each data packet of the group of received data packets; assigning a time stamp to each data packet of the group of data packets, in particular on the basis of the arrival time of a data packet received before the specific data packet; determining the time difference between the determined arrival time and the assigned time stamp for each data packet of the group of data packets; determining the smallest time difference from the determined time differences; assigning a time stamp to the specific data packet on the basis of the arrival time which was determined for the data packet for which the smallest time difference was determined.

The arrival time of a plurality of data packets is therefore taken into account when assigning the time stamp to the specific data packet. In the previously known methods, it was always only a single arrival time which was taken into account as reference for the determination of the time stamp, in particular the earliest arrival time up to then with reference to the cycle of the sensor. However, if said earliest arrival time is not representative of the actual measurement instant, the error produced can no longer be corrected. According to the method presented here, what is sought is confirmation of the existing reference and hence an early arrival time which has occurred once. In this case, the search relates to a group of received data packets, that is to say a plurality of data packets. If no confirmation is found, the reference is reset for the specific data packet, namely to the arrival time with the smallest time difference. This new reference can also be used for assigning time stamps for data packets which are subsequently received.

By way of further explanation, the typically occurring case that the arrival time of the data packets of the group is after the respectively assigned time stamp should be discussed here. In a typical implementation, the time differences are then all greater than zero. In this case, the reference for determining the time stamp is set to the arrival time of the data packet which has an arrival time which is at least later than the time stamp determined on the previous reference. It is possible to correct the reference if it has been set too early in comparison with the actual cyclical measurement instants of the sensor. If, in contrast, the smallest time difference is zero, the previous reference is confirmed. The subsequent assignment of the arrival time to the "new reference" then does not change with respect to the "old reference" to the further assigned time stamps.

The correction is done taking into consideration a group, typically of a relatively large number of data packets, for example 10, 100 or 1000 data packets. A group of data packets does not necessarily have to contain all directly successively received data packets but instead can also comprise only every second, third or any other selected data packet of the successively received data packets. The smallest time difference can relate to the magnitude of the time difference.

Provision can be made for all steps of the method up until the last two steps (determining the smallest time difference, assigning a time stamp to the specific data packet) to be performed in individual steps for each (or each second, third or any other selected) received data packet, which is in each case a subset of the steps of the method (up until the last two steps). In particular, therefore, each data packet is assigned a time stamp when it is received at the processing unit.

Furthermore, provision can be made for the method to be performed for a new group of data packets. In addition, provision can be made for the arrival time which was determined for the data packet for which the smallest time difference was determined to be used as reference in determining the time stamps of subsequent data packets.

In an advantageous development, provision can be made for an adapted time stamp to be determined for the specific data packet. For said adapted time stamp, a minimum processing time is subtracted from the time stamp. The minimum processing time corresponds to the time which a data packet requires at minimum for transmission from the sensor to the processing unit. In this way, the actual measurement instant of the sensor can be estimated in an even better manner. Even when using an adapted time stamp, there is often the danger that a premature measurement of a sensor or a cycle time which was estimated to be too short of the sensor when settling (according to the two problems illustrated above with reference to FIGS. 2 and 3) leads to an adapted time stamp that is before the actual measurement instant of the sensor. In particular, when using the adapted time stamp, the possibility for correction to a later placement is therefore important (on the basis of the actual cyclical measurement instants of the sensor).

In a development, the group of data packets comprises data packets which are after a data packet on the basis of the arrival time of which time stamps have been determined for each data packet of the group of preceding data packets. Provision can therefore be made for the group of data packets to comprise only data packets which have not reset the reference according to the method of the prior art. Once an arrival time has been measured for a data packet, the arrival time being before the assigned time stamp of said data packet, the reference is reset to the arrival time and the group of data packets is reset so that it does not contain any more data packets. Only further subsequent data packets are assigned to the group. Provision can likewise be made for a new and further group of data packets to comprise only data packets the arrival time of which is after the arrival time of the specific data packet if said specific data packet has been assigned a time stamp taking into account the smallest time difference.

Provision can be made for the group of data packets to comprise a minimum number of data packets. This can mean that the last two steps of the method (determining the smallest time difference and assigning a time stamp to the specific data packet) are then only performed if a minimum number of data packets are present in the group. This can mean that, after a reference has been reset, a minimum number of data packets which do not set an earlier reference must first be received before the reference is shifted to a reference which is comparatively later in the time cycle of the sensor. This can be a meaningful requirement: only when the early reference is also not confirmed by the arrival times of a large group of further data packets is the reference shifted to the "next-latest" instant (arrival time). Only in this case does an "outlier" or a reference which was set too early during the settling appear to be concerned.

In detail, the assignment of a time stamp for each data packet from the group of data packets is performed individually and successively; and the assignment comprises: estimating the cycle time of the sensor on the basis of the time between the arrival times of data packets, in particular in each case two successive data packets, for a data packet from the group of data packets; determining the time stamp for the data packet from the group of data packets on the basis of the arrival time of a data packet received prior to the data packet from the group of data packets and of the estimated cycle time, wherein the previously received data packet is included, in particular, in the group or precedes a data packet of the group which was received first in terms of time; checking whether the arrival time for the data packet of the group of data packets is before the time stamp determined for said data packet; if the arrival time is before the time stamp: fixing the time stamp to the arrival time, and determining the time stamp of subsequently received data packets of the group of data packets on the basis of the arrival time. As already mentioned above, the time stamps are therefore assigned when the data packets enter the central processing unit. The estimated cycle time can be an arithmetic, geometric or running average or can be estimated using a Kalman filter known from the prior art.

In another development, provision can be made for the time stamp for the specific data packet to be assigned before the method set out above is performed. The method is then only performed if the arrival time is later than the time stamp (and hence the reference is not determined again). In other words, the method also comprises: assigning a time stamp to the specific data packet on the basis of the arrival time of a data packet preceding the specific data packet; checking whether the arrival time of the specific data packet is after the assigned time stamp; if the arrival time of the specific data packet is after the assigned time stamp: performing the steps of one of the methods above according to the first aspect.

In another aspect, a device comprises an electronic calculation unit (also referred to as processing unit herein) which is set up to perform a method as described in one of the methods set out above. The electronic calculation unit can be a microcontroller, a computer or dedicated circuits, optionally with the required interfaces. The calculation unit can be set up using software. In another aspect, a motor vehicle includes such a device.

In another aspect, a computer program comprises program code instructions for performing one of the methods set out above. The instructions of the computer program can prompt a computer to perform the steps of one of the methods set out above.

Other objects, advantages and novel features of the present invention will become apparent from the following detailed description of one or more preferred embodiments when considered in conjunction with the accompanying drawings.

BRIEF DESCRIPTION OF THE DRAWINGS

Identical reference signs or symbols relate to corresponding elements throughout the figures.

DETAILED DESCRIPTION OF THE DRAWINGS

Figure 1:
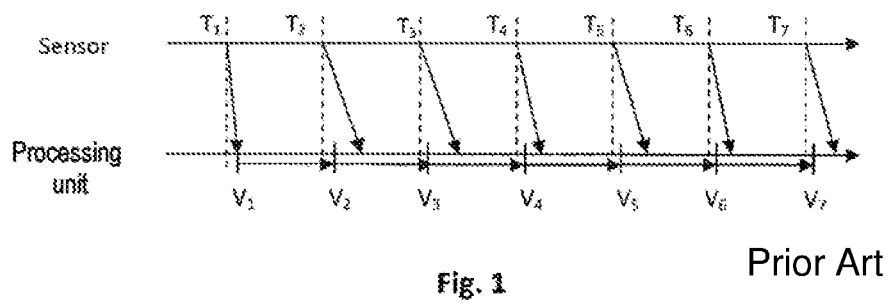
FIG. 1 shows the scheme for assigning a time stamp to received data packets.
Figure 2:
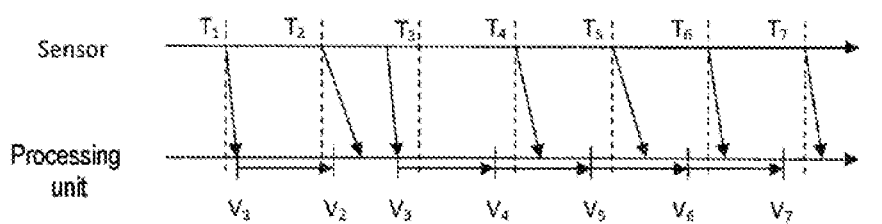
FIG. 2 schematically shows an occurrence of error in determining a time stamp according to the scheme explained with reference to FIG. 1.
Figure 3:
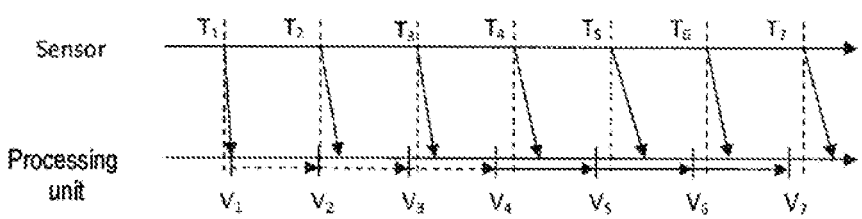
FIG. 3 schematically shows an occurrence of error in determining a time stamp according to the scheme explained with reference to FIG. 1.
Figure 4:
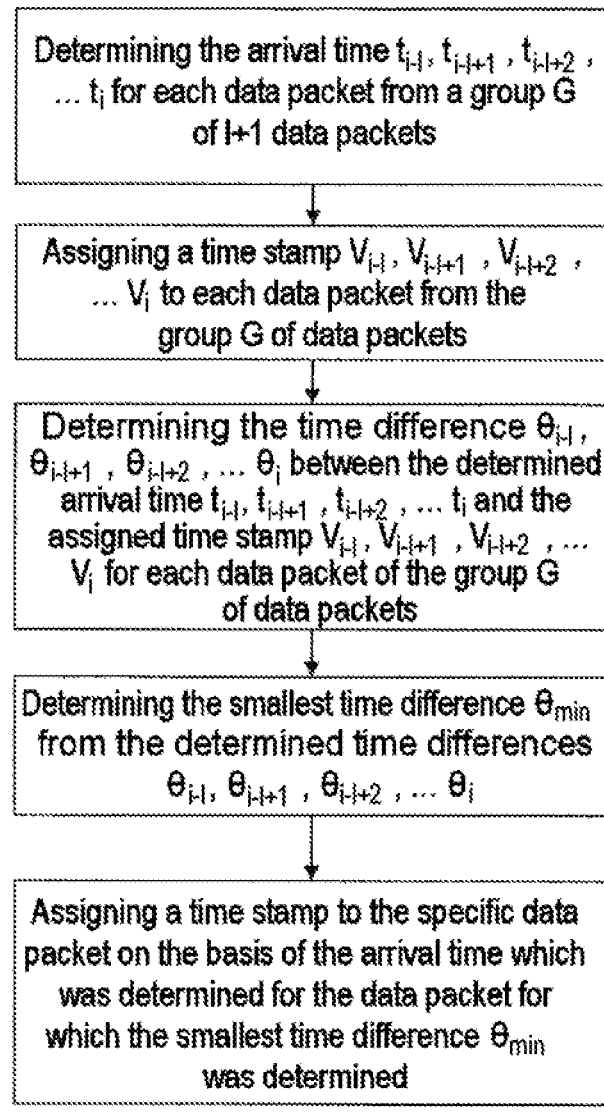
FIG. 4 is a flow chart for carrying out the invention according to an exemplary embodiment.

FIG. 4 is a flow chart for carrying out the invention according to an exemplary embodiment for assigning a time stamp to the specific data packet. The specific data packet may be part of a group G of data packets. In this case, it should be assumed that the last-received data packet i is part of the group G. However, it is also contemplated that the data packet i is not part of the group G and, for example, is received after the last-received data packet of the group G. Firstly, the arrival time $t_{i-1}, t_{i-1+1}, t_{i-1+2}, \ldots t_i$ is determined for each data packet from a group G of I+1 data packets. The time stamps $V_{i-1}, V_{i-1+1}, V_{i-1+2}, \ldots V_i$ are assigned to said data packets and the time differences $\theta_{i-1}, \theta_{i-1+1}, \theta_{i-1+2}, \ldots \theta_i$ between the determined arrival time $t_{i-1}, t_{i-1+1}, t_{i-1+2}, \ldots t_i$ and the assigned time stamp $V_{i-1}, V_{i-1+1}, V_{i-1+2}, \ldots V_i$ are determined for each data packet of the group G. The smallest time difference $\theta_{min}$ is determined from the determined time differences $\theta_{i-1}, \theta_{i-1+1}, \theta_{i-1+2}, \ldots \theta_i$. Preferably, the group of data packets is selected such that only data packets which are received after a data packet on the basis of whose arrival time a reference has been set are included in the group. In particular, this can mean that the time differences are all greater than zero. Finally, a time stamp is again assigned to the specific data packet on the basis of the arrival time which was determined for the data packet for which the smallest time difference $\theta_{min}$ was determined. This arrival time can also be used as new reference for assigning time stamps $V_{1+1}, V_{1+2}$.

In one variant, the group may also be selected or kept such that negative time differences are included. In this case, the smallest time difference is the negative time difference with the largest magnitude.

Figure 5:
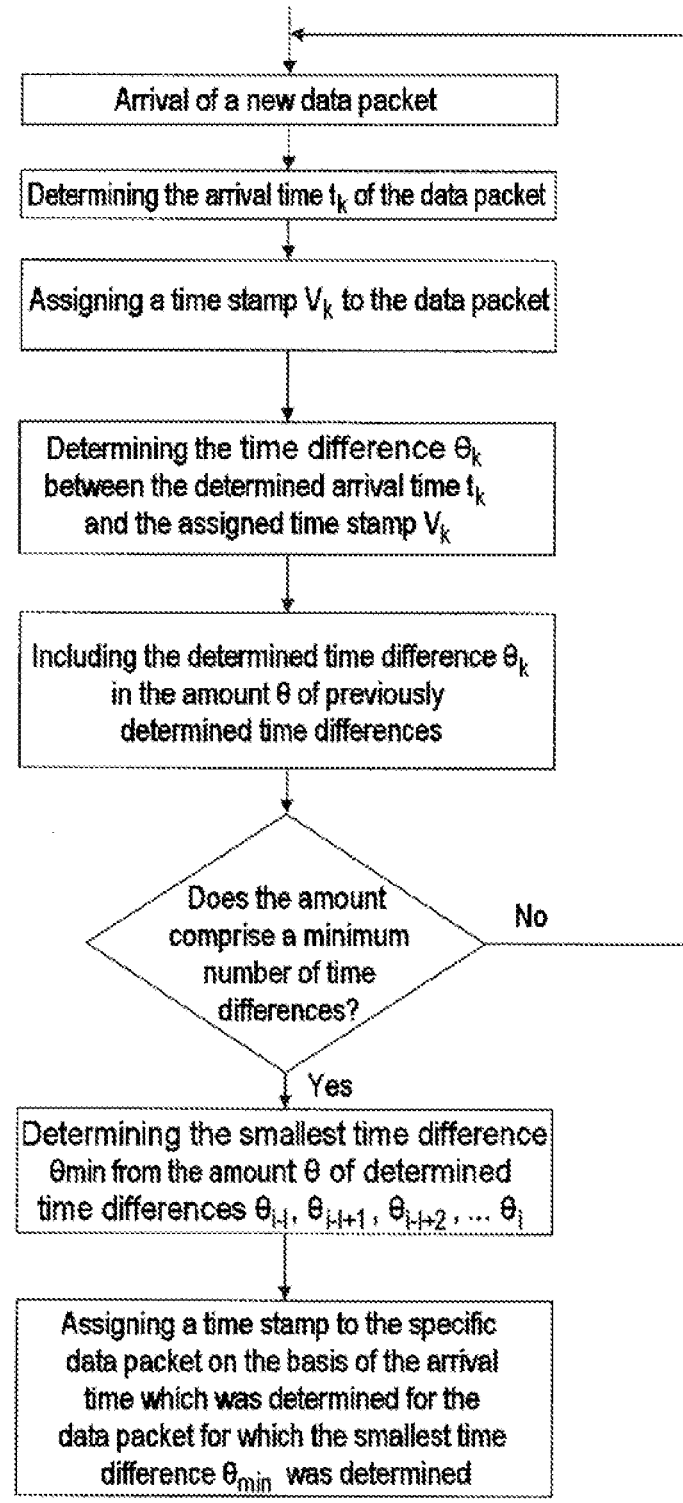
FIG. 5 is a flow chart for carrying out the invention according to an exemplary embodiment.

FIG. 5 is a flow chart for carrying out the invention according to an exemplary embodiment. In this example, the steps up until the last two are performed individually for each received data packet. If the steps individually performed for each data packet are performed for all of the data packets of the group, this means that the arrival times for each data packet of the group are determined and the time stamps for each data packet of the group are assigned.

After a new data packet has arrived, the arrival time $t_k$ is determined for each received data packet k and a time stamp $V_k$ is assigned thereto and the time difference $\theta_k$ is determined and included in an amount $\theta$. Once the amount comprises a minimum number of elements, often a relatively large number, the smallest time difference is determined. Finally, a time stamp is assigned to the specific data packet on the basis of the arrival time which was determined for the data packet for which the smallest time difference $\theta_{min}$ was determined. It also applies here again that, if a received data packet shifts the reference, the amount $\theta$ can be reset to the empty amount. Provision thereof can likewise be made when the last step of the method is performed. In other words, the amount $\theta$ comprises only time differences for the data packets which have not shifted the reference (that is to say, the arrival time thereof is not before the originally assigned time stamp).

Figure 6:
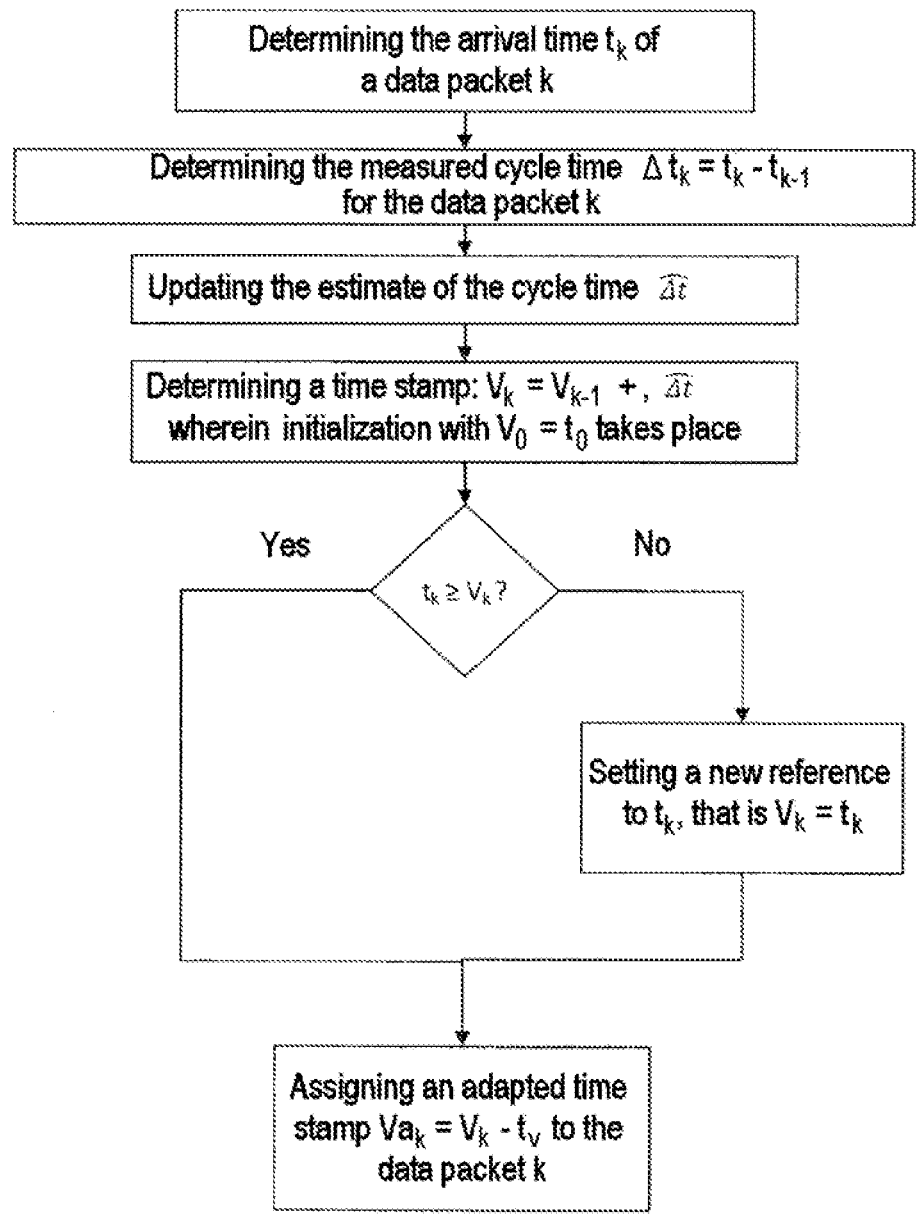
FIG. 6 is a flow chart for assigning an adapted time stamp as can be used in an exemplary embodiment.

FIG. 6 is a flow chart for assigning a time stamp and an adapted time stamp, as can be used in an exemplary embodiment and hence can be part of an exemplary embodiment. In the sequence illustrated here, individual arrival times are determined for the received data packets of the group of data packets and time stamps and adapted time stamps are assigned. Once the steps have been performed for each data packet of the group of data packets, the arrival times are determined for each data packet of the group and the time stamps and adapted time stamps are assigned.

Hence, it begins with determining the arrival time $t_k$ of a data packet k. Subsequently, the measured cycle time $\Delta t_k = t_k - t_{k-1}$ for the data packet k is determined. Building on this, the estimation of the cycle time $\widehat{\Delta t}$ is updated. The estimation of the cycle time can be performed as a running average, as illustrated, for example, with reference to FIG. 7. Then, said cycle time is used in order to determine a time stamp $V_k$ for the data packet according to the formula $V_k = V_{k-1} + \widehat{\Delta t}$, wherein initialization with $V_0 = t_0$ takes place. At this point, it is checked whether the time stamp $V_k$ is after the arrival time $t_k$. If this is the case, the adapted time stamp $Va_k = V_k - t_\nu$ is assigned to the data packet. If the arrival time $t_k$ is before the time stamp $V_k$, said arrival time is set as a new reference and the time stamp $V_k$ is set to $t_k$. Proceeding therefrom, the adapted time stamp $Va_k = V_k - t_\nu$ is then likewise assigned.

In this example, the time stamp $V_k$ is different from the adapted time stamp $Va_k$ in that another processing time $t_\nu$ is subtracted from the time stamp $V_k$. This procedure is based on the model that, proceeding from the actual measurement instant of the sensor, delays the arrival time of the data packet with the sensor information by a minimum processing time $t_\nu$ which cannot be undershot. The time at which the data packet then actually arrives at the processing unit is additionally a determined arbitrary time longer, the so-called jitter. The jitter is a random time delay greater than zero. By taking into account the processing time $t_\nu$, the adapted time stamp can estimate the actual measurement instant of the sensor in an improved manner. The processing time $t_\nu$ can be determined using methods known from the prior art, such as a transit-time measurement under ideal conditions or series of tests. The adoption of the model for the determined arrival time $t_k$ is therefore the actual instant of the sensor measurement which belongs to the data packet k, $+t_\nu + j_k$, wherein $j_k$ describes the jitter for the data packet k. In other words, the adoption of the model for the determined arrival time is that the data packet arrives later than the actual instant of the sensor measurement by the processing time and the jitter.

Figure 7:
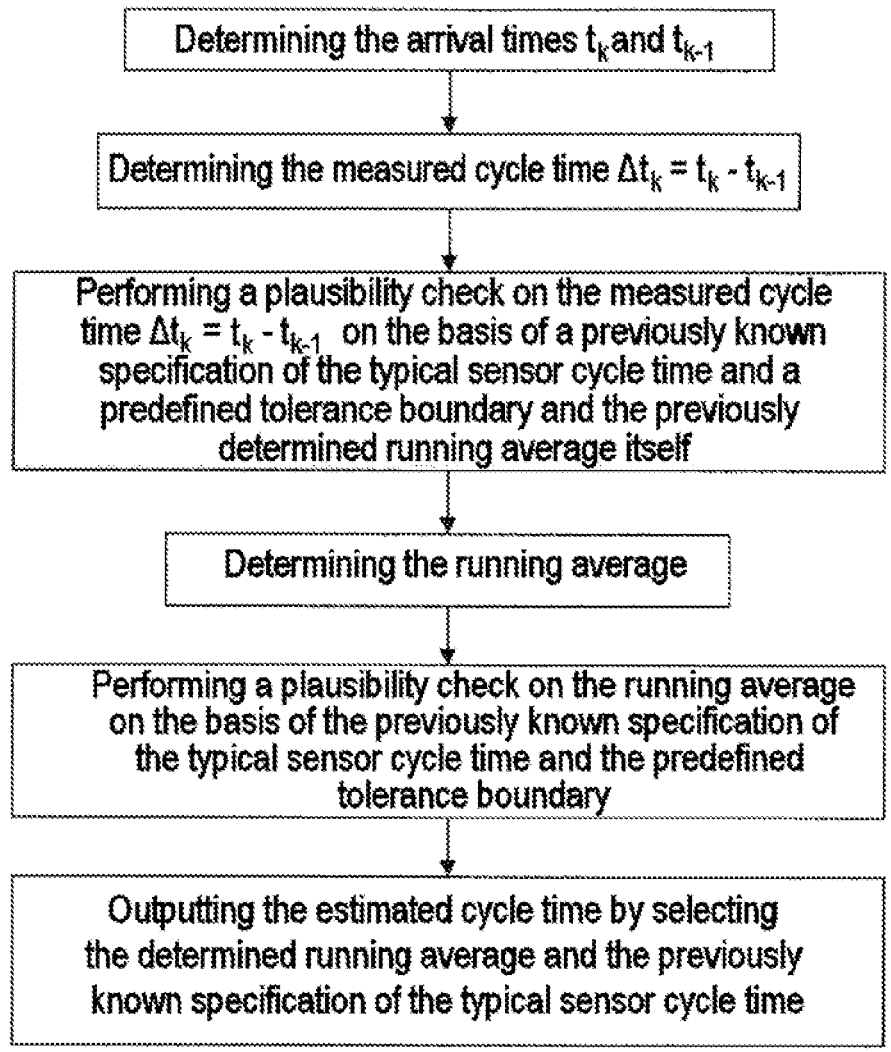
FIG. 7 is a flow chart for estimating the cycle time, as can be used in an exemplary embodiment.

FIG. 7 is a flow chart for estimating the cycle time, as can be used in an exemplary embodiment and hence can be part of an exemplary embodiment. Firstly, the arrival times $t_k$ and $t_{k-1}$ of two successive data packets k and k−1 are determined, optionally by measurement, the difference between which arrival times is the measured cycle time $\Delta t_k = t_k - t_{k-1}$. A plausibility check is performed for this measured cycle time on the basis of a previously known specification of the typical sensor cycle time (for example, a stored specification from the sensor manufacturer) and a predefined tolerance boundary (for example stored in a configuration file) and the previously determined running average itself. If the measured cycle time is found to be implausible, the previously determined specification or the previously calculated average can be output. If the measured cycle time is found to be plausible, the running average is determined. This can be calculated using the formula:

$$\Delta \hat{t}_k = \left(1 - \frac{1}{n}\right) \widehat{\Delta t_{k-1}} + \frac{1}{n} \Delta t_k,$$

wherein n can be the smaller of a predefined value N and k (k is the absolute count of the received data packets).

Subsequently, the plausibility of the running average is checked on the basis of the previously known specification of the typical sensor cycle time and the predetermined tolerance boundary. If the average is found to be implausible, the predetermined specification is output. If the average is found to be plausible, said average is output.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for assigning a time stamp to a specific data packet which, as with a group of received data packets, is received from a cyclically operating sensor, wherein the specific data packet is part of the group of received data packets, the method comprising the acts of:
    determining a time of arrival for each data packet of the group of received data packets;
    assigning a time stamp to each data packet of the group of data packets based on a reference timestamp of a first data packet received prior to the group of data packets and an estimated cycle time of the sensor;
    determining a time difference between the determined arrival time and the assigned time stamp for each data packet of the group of data packets;
    determining a smallest time difference from the determined time differences; and
    correct the time stamp of the specific data packet based on the arrival time of the data packet for which the smallest time difference was determined.

2. The method according to claim 1, wherein the arrival time of each data packet of the group of data packets is later than a respectively assigned time stamp.

3. The method according to claim 1, wherein the group of data packets comprises data packets which have been received after a data packet based on the arrival time of which time stamps assigned to each data packet of the group of data packets were determined.

4. The method according to claim 1, wherein the group of data packets comprises a minimum number of data packets and/or wherein the specific data packet is included in the group of data packets, or is received later as the last-received data packet of the group.

5. The method according to claim 1,
    wherein the assignment of a time stamp for each data packet from the group of data packets is performed individually and successively; and wherein the assignment comprises:
    a) estimating the cycle time of the sensor on the basis of the time between the arrival times of data packets, in each case two successive data packets, for a data packet from the group of data packets;
    b) determining the time stamp for the data packet from the group of data packets on the basis of the arrival time of the first data packet and of the estimated cycle time;
    c) checking whether the arrival time for the data packet of the group of data packets is before the time stamp determined for said data packet; and
    if the arrival time is before the time stamp:
        1) fixing the time stamp to the arrival time, and
        2) determining the time stamp of subsequently received data packets of the group of data packets on the basis of the arrival time.

6. The method according to claim 5, wherein the estimated cycle time is an arithmetic, geometric or running average.

7. The method according to claim 1, wherein prior to performing the acts of claim 1, the method comprising the acts of:
    assigning a time stamp to the specific data packet based on the arrival time of a data packet preceding the specific data packet;
    checking whether the arrival time of the specific data packet is after the assigned time stamp; and
    if the arrival time of the specific data packet is after the assigned time stamp, then performing the acts of claim 1.

8. The method according to claim 1, further comprising setting a new reference timestamp for assigning time stamps to one or more data packets received after the group of received data packets based on the arrival time which was determined for the data packet for which the smallest time difference was determined.

9. A motor vehicle, comprising:
    an electronic controller that executes a program that:
        determines a time of arrival for each data packet of the group of received data packets;
        assigns a time stamp to each data packet of the group of data packets based on a reference timestamp of a first data packet received prior to the group of data packets and an estimated cycle time of the sensor;
        determines a time difference between the determined arrival time and the assigned time stamp for each data packet of the group of data packets;
        determines a smallest time difference from the determined time differences; and
        correcting the time stamp of the specific data packet based on the arrival time of the data packet for which the smallest time difference was determined.

10. The motor vehicle according to claim 9, wherein the electronic controller further executes the program to set a new reference timestamp for assigning time stamps to one or more data packets received after the group of received data packets based on the arrival time which was determined for the data packet for which the smallest time difference was determined.

11. A computer product comprising a non-transitory computer readable medium having stored thereon program code segments that:
    determines a time of arrival for each data packet of the group of received data packets;
    assigns a time stamp to each data packet of the group of data packets based on a reference timestamp of a first data packet received prior to the group of data packets and an estimated cycle time of the sensor;
    determines a time difference between the determined arrival time and the assigned time stamp for each data packet of the group of data packets;
    determines a smallest time difference from the determined time differences; and
    correcting the time stamp of the specific data packet based on the arrival time of the data packet for which the smallest time difference was determined.

12. The computer product according to claim 11, wherein the non-transitory computer readable medium further comprises program code segments stored thereon that set a new reference timestamp for assigning time stamps to one or more data packets received after the group of received data packets based on the arrival time which was determined for the data packet for which the smallest time difference was determined.

* * * * *